United States Patent
Dry

(10) Patent No.: US 9,599,399 B2
(45) Date of Patent: Mar. 21, 2017

(54) MATERIAL SUPPLY APPARATUS AND PROCESS

(71) Applicant: Technological Resources Pty Limited, Melbourne, Victoria (AU)

(72) Inventor: Rodney James Dry, City Beach (AU)

(73) Assignee: Technological Resources Pty Limited, Melbourne (AU)

( * ) Notice: Subject to any disclaimer, the term of this patent is extended or adjusted under 35 U.S.C. 154(b) by 270 days.

(21) Appl. No.: 14/269,911

(22) Filed: May 5, 2014

(65) Prior Publication Data

US 2014/0239562 A1 Aug. 28, 2014

Related U.S. Application Data

(62) Division of application No. 13/119,140, filed as application No. PCT/AU2009/001221 on Sep. 16, 2009, now Pat. No. 8,741,027.

(30) Foreign Application Priority Data

Sep. 16, 2008 (AU) ................................ 2008904796

(51) Int. Cl.

| C22B 5/00 | (2006.01) |
|---|---|
| F27D 3/00 | (2006.01) |
| C21C 5/46 | (2006.01) |
| C21C 5/52 | (2006.01) |
| C22B 5/10 | (2006.01) |
| F27B 3/18 | (2006.01) |
| F27D 3/18 | (2006.01) |
| F27D 19/00 | (2006.01) |
| F27D 21/00 | (2006.01) |
| C22B 4/08 | (2006.01) |

(52) U.S. Cl.
CPC .............. *F27D 3/00* (2013.01); *C21C 5/4606* (2013.01); *C21C 5/466* (2013.01); *C21C 5/527* (2013.01); *C21C 5/5217* (2013.01); *C22B 5/10* (2013.01); *F27B 3/18* (2013.01); *F27D 3/18* (2013.01); *F27D 19/00* (2013.01); *F27D 21/00* (2013.01); *C22B 4/08* (2013.01); *Y02P 10/216* (2015.11)

(58) Field of Classification Search
CPC .......... C21B 15/00; C21B 11/00; C21B 13/00
USPC .................................................. 266/268, 216
See application file for complete search history.

(56) References Cited

U.S. PATENT DOCUMENTS

| 3,948,640 A | 4/1976 | Elvander et al. |
|---|---|---|
| 6,083,296 A | 7/2000 | Innes et al. |
| 6,214,085 B1 | 4/2001 | Calderon et al. |

(Continued)

FOREIGN PATENT DOCUMENTS

| CN | 1181112 A | 5/1998 |
|---|---|---|
| CN | 1458981 A | 6/2006 |

(Continued)

OTHER PUBLICATIONS

International Preliminary Report on Patentability dated Mar. 22, 2011, for International Application No. PCT/AU2009/001221.

(Continued)

*Primary Examiner* — Scott Kastler
(74) *Attorney, Agent, or Firm* — Banner & Witcoff, Ltd.

(57) ABSTRACT

A material supply apparatus and process for co-injecting heated solid metalliferous material and solid carbonaceous material via a solids injection lance into a direct smelting vessel are disclosed.

9 Claims, 2 Drawing Sheets

(56) References Cited

U.S. PATENT DOCUMENTS

| | | | |
|---|---|---|---|
| 6,428,603 B1 | 8/2002 | Batterham | |
| 6,482,249 B1 | 11/2002 | Dry | |
| 6,596,223 B2 | 7/2003 | Dry | |
| 7,494,615 B2 | 2/2009 | Burke et al. | |
| 8,741,027 B2* | 6/2014 | Dry | C21C 5/4606 |
| | | | 266/216 |
| 2003/0071399 A1* | 4/2003 | Leigh | C21B 13/00 |
| | | | 266/267 |
| 2006/0119020 A1 | 6/2006 | Burke et al. | |
| 2007/0272058 A1 | 11/2007 | Orth et al. | |
| 2012/0067171 A1* | 3/2012 | Pilote | C21B 13/0013 |
| | | | 75/707 |

FOREIGN PATENT DOCUMENTS

| | | |
|---|---|---|
| CN | 1782105 A | 6/2006 |
| GC | WO2006010208 A1 | 2/2006 |

OTHER PUBLICATIONS

Jewel et al. Demonstration of Hlsmelt process in DOE's clean coal technology program. 18th Annual International Pittsburgh Coal Conference Dec. 2001, Coal's International Future: The Technical Challenge, p. 1-14.

International Search Report from the Australian Patent Office for International Application No. PCT/AU2009/001221 (mail date Nov. 10, 2009).

* cited by examiner

MATERIAL SUPPLY APPARATUS AND PROCESS

CROSS REFERENCE TO RELATED APPLICATION

This is a divisional application of Ser. No. 13/119,140 filed Aug. 17, 2011, now U.S. Pat. No. 8,741,027 issued Jun. 3, 2014 entitled "Material Supply Apparatus and Process" which is a 371 National phase application of Application No. PCT/AU2009/001221, filed Sep. 16, 2009 entitled "A Material Supply Apparatus and Process" which claims priority to AU 2008904796, filed Sep. 16, 2008 entitled "A Material Supply Apparatus and Process" for which priority is claimed. All of the above applications are incorporated herein by reference in their entirety.

FIELD OF THE INVENTION

The present invention relates to an apparatus and to a process, both for supplying metalliferous and carbonaceous materials to a direct smelting vessel.

BACKGROUND OF THE INVENTION

A known direct smelting process, which relies principally on a molten bath as a reaction medium, and is generally referred to as the Hismelt process, is described in International application PCT/AU96/00197 (WO 96/31627) in the name of the applicant The Hismelt process as described in the International application in the context of producing molten iron includes:
 (a) forming a bath of molten iron and slag in a vessel;
 (b) injecting into the bath: (i) metalliferous material, typically iron oxides; and (ii) solid carbonaceous material, typically coal, which acts as a reductant of the iron oxides and a source of energy; and
 (c) smelting metalliferous material to iron in the molten bath.

The term "smelting" is herein understood to mean thermal processing wherein chemical reactions that reduce metal oxides take place to produce molten metal.

The Hismelt process also includes post-combusting reaction gases, such as CO and H2 released from the bath, in the space above the bath with oxygen-containing gas, typically air, and transferring the heat generated by the post-combustion to the bath to contribute to the thermal energy required to smelt the metalliferous materials.

The Hismelt process also includes forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the Hismelt process metalliferous material and solid carbonaceous material are injected into a molten bath through a number of solids injection lances (sometimes referred to as "tuyeres") which are inclined to the vertical so as to extend downwardly and inwardly through a side wall of a direct smelting vessel and into a lower region of the vessel so as to deliver at least part of the solids material into a molten metal layer in the bottom of the vessel. To promote the post-combustion of reaction gases in an upper part of the vessel, a blast of hot air, which may be oxygen-enriched, is injected into an upper region of the vessel through a downwardly extending hot air injection lance. Off gases resulting from post-combustion of reaction gases in the vessel are taken away from the upper part of the vessel through an off gas duct. The vessel includes refractory-lined water cooled panels in the side wall and the roof of the vessel, and water is circulated continuously through the panels in a continuous circuit.

The Hismelt process enables large quantities of molten iron to be produced by direct smelting of metalliferous material. To enable such levels of production, large quantities of both metalliferous material and carbonaceous material must be supplied to the vessel.

The present invention provides an effective apparatus and process for the delivery of both metalliferous material and carbonaceous material to a direct smelting vessel.

The above description is not to be taken as an admission of the common general knowledge in Australia or elsewhere.

SUMMARY OF THE INVENTION

The present invention provides a material supply apparatus for supplying heated solid metalliferous material and solid carbonaceous material to a direct smelting vessel having one or more than one solids injection lance, comprising:
 (a) a first solids supply line for transporting heated solid metalliferous material from a dispensing/metering unit to an inlet end of at least one lance; and
 (b) an assembly for supplying solid carbonaceous material from a dispensing/metering unit directly into the lance or to the first solids supply line downstream of the ore dispensing/metering unit so that there can be co-injection of heated metalliferous material and carbonaceous material from the lance into the vessel.

There are a number of factors that are relevant to the location of the assembly for supplying solid carbonaceous material. Relevant factors include tar formation that could block the line and unwanted premature reactions between heated metalliferous material and carbonaceous material prior to the material entering the vessel.

For the above reasons, it is preferred that the assembly for supplying solid carbonaceous material be adapted to supply solid carbonaceous material directly into the lance or to the first solids supply line as close as practicable to the lance.

The assembly for supplying solid carbonaceous material may be adapted to supply solid carbonaceous material to the first solids supply line at a location on the line that is within 50% of the length of the line from an inlet end of the lance, with the length of the line being measured between the location and the inlet end of the lance.

The assembly for supplying solid carbonaceous material may also be adapted to supply solid carbonaceous material to the first solids supply line at a location on the line that is within 20% of the length of the line from the inlet end of the lance.

The assembly for supplying solid carbonaceous material may be adapted to supply solid carbonaceous material to the first solids supply line at a location on the line that is less than 1 second, preferably less than 0.5 seconds, conveying time to an inlet end of the lance in a situation in which the conveying speed in the line is less than 50 msec, preferably 20-30 msec.

It is noted that, typically, the solid carbonaceous material is conveyed in a gas phase and that the references herein to "conveying speed" are understood to be references to the conveying speed of the gas phase. Typically, the gas phase is an oxygen-deficient gas phase, such as nitrogen.

The assembly for supplying solid carbonaceous material may be adapted to supply solid carbonaceous material to the first solids supply line at a location on the line that is less than 30 m, preferably less than 20 m, from an inlet end of the lance, with the length of the line being measured between the location and the inlet end of the lance, in a situation in which the conveying speed in the line is less than 50 m/sec.

The assembly for supplying solid carbonaceous material may comprise a second solids supply line for transporting solid carbonaceous material from the carbonaceous material dispensing/metering unit to the first solids supply line.

The first solids supply line may comprise a section that extends upwardly to at least the level of the inlet end of the lance, and the second solids supply line may be connected to the first solids supply line at a lower end of the upwardly extending section.

The first solids supply line may alternatively comprise a section that extends upwardly to at least the level of the inlet end of the lance, and the second solids supply line may be connected to the first solids supply line at an upper end of the upwardly extending section.

The first solids supply line may comprise a final section that extends downwardly and inwardly with respect to the vessel to the inlet end of the lance, and the second solids supply line may be connected to the final section.

The solid metalliferous material may be iron ore, preferably iron ore fines.

When the solid metalliferous material is iron ore, preferably the iron ore is at a temperature of at least 500° C. in the first solids supply line.

The solid carbonaceous material may be coal.

The present invention also provides a direct smelting plant comprising:

(a) a direct smelting vessel having one or more than one solids injection lance for injecting heated solid metalliferous material and solid carbonaceous material into the vessel;

(b) a pre-treatment unit, such as a pre-heater, for heating solid metalliferous material;

(c) a dispensing/metering unit for heated solid metalliferous material;

(d) a dispensing/metering unit for solid carbonaceous material; and (e) the above-described material supply apparatus.

The present invention also provides a process for supplying solids materials to a direct smelting vessel having one or more than one solid injection lance, the process comprising supplying heated solid metalliferous material and solid carbonaceous material to a solids injection lance extending into the vessel and co-injecting heated metalliferous material and solid carbonaceous material into the vessel via the lance.

The process may comprise supplying heated solid metalliferous material and solid carbonaceous material to the solids injection lance or lances in the above-described plant and co-injecting heated metalliferous material and solid carbonaceous material into the vessel via the lance or lances.

The solid metalliferous material may be iron ore, preferably iron ore fines.

When the solid metalliferous material is iron ore, preferably the iron ore is at a temperature of at least 500° C. in the first solids supply line.

The solid carbonaceous material may be coal.

When the solid metalliferous material is iron ore and the solid carbonaceous material is coal, the process may comprise supplying a total of at least 160 t/h ore and at least 70 t/h coal to the direct smelting vessel.

The process may comprise supplying heated solid metalliferous material and solid carbonaceous material to the direct smelting vessel via the lance with a pressure drop of 1.0 to 2.0 bar (g).

The present invention also provides a process for direct smelting solid metalliferous material and producing molten metal comprising:

(a) forming a bath of molten metal and slag in a direct smelting vessel;

(b) supplying heated solid metalliferous material and solid carbonaceous material to a solids injection lance extending into the vessel and co-injecting heated metalliferous material and solid carbonaceous material into the vessel via the lance;

(c) injecting oxygen-containing gas into the vessel and post-combusting combustible gases generated in the vessel; and (d) smelting solid metalliferous material to molten metal in the bath.

The solid metalliferous material may be iron ore, preferably iron ore fines.

When the solid metalliferous material is iron ore, preferably the iron ore is at a temperature of at least 500° C. in the first solids supply line.

The solid carbonaceous material may be coal.

When the solid metalliferous material is iron ore and the solid carbonaceous material is coal, the process may comprise supplying a total of at least 160 t/h ore and at least 70 t/h coal to the direct smelting vessel.

The process may comprise supplying heated solid metalliferous material and solid carbonaceous material to the direct smelting vessel via the lance with a pressure drop of 1.0 to 2.0 bar (g).

BRIEF DESCRIPTION OF THE DRAWING

The present invention is described further by way of example only with reference to the accompanying drawings, of which.

DETAILED DESCRIPTION OF EMBODIMENTS OF THE INVENTION

Figure 1:
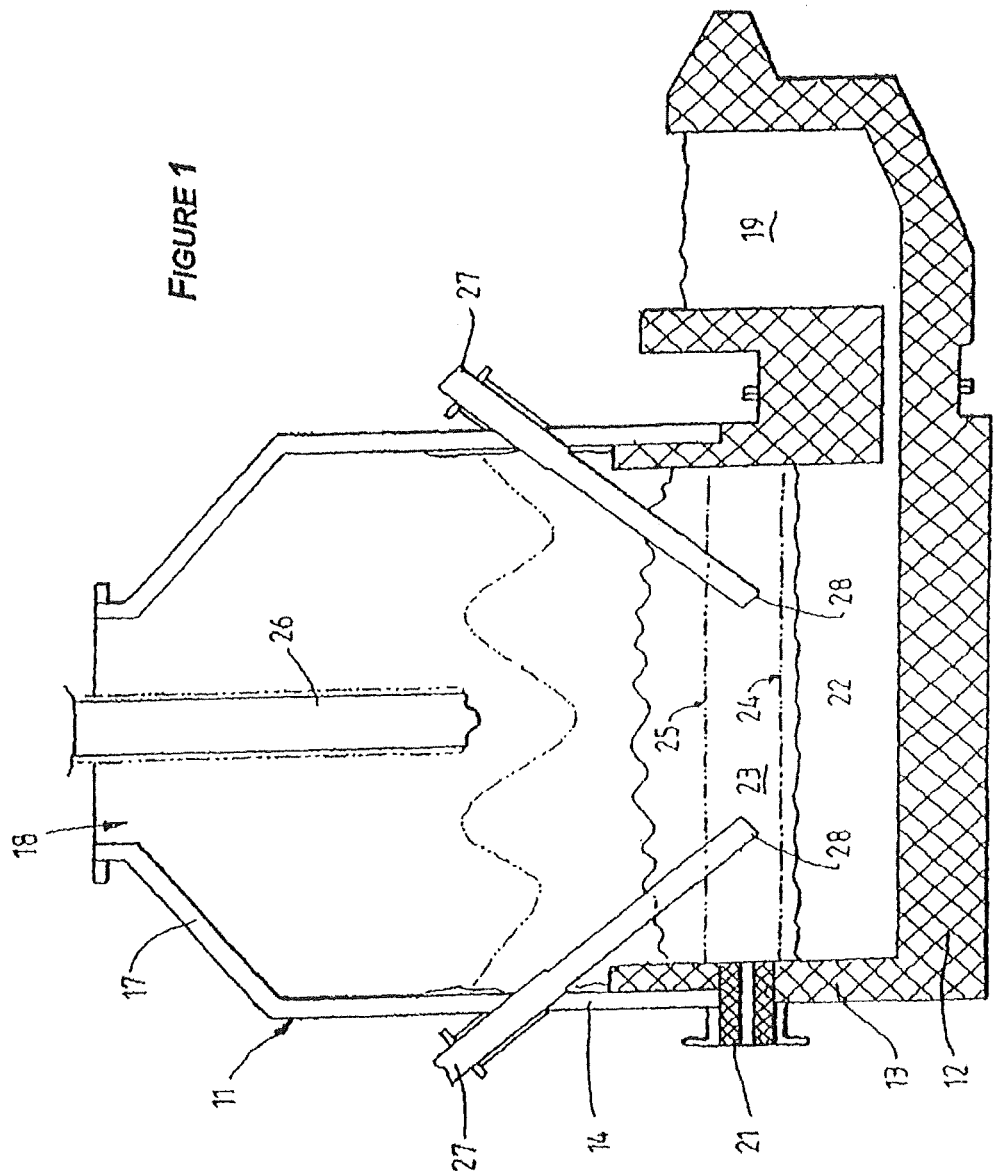
FIG. 1 is a vertical cross-section through a direct smelting vessel that forms part of an embodiment of a direct smelting plant in accordance with the present invention.

FIG. 1 shows a direct smelting vessel 11 that forms a part of a plant that is suitable particularly to be used to carry out the Hismelt process as described in International patent application PCT/AU96/00197 for smelting solid metalliferous material in the form of iron ore fines. The following description is in the context of smelting solid metalliferous material in the form of iron ore fines to produce molten iron in accordance with the Hismelt process. However, it will be appreciated that the present invention is applicable to smelting any metalliferous material, including ores, partly reduced ores, and metal-containing waste streams, and including iron-containing materials and other metal-containing materials.

The vessel 11 has a hearth that includes a base 12 and sides 13 formed from refractory bricks, side walls 14, which form a generally cylindrical barrel extending upwardly from the sides 13 of the hearth, and a roof 17. Water-cooled panels (not shown) are provided for transferring heat from the side walls 14 and also from the roof 17. The vessel 11 is further provided with a forehearth 19, through which molten iron is continuously discharged during smelting, and a tap-hole 21, through which molten slag is periodically discharged during smelting. The roof 17 is provided with an outlet 18 through which process off gases are discharged.

In use of the vessel 11 to smelt iron ore fines to produce molten iron in accordance with the Hismelt process, the vessel 11 contains a molten bath of iron and slag, which includes a layer 22 of molten metal and a layer 23 of molten slag on the metal layer 22. The position of the nominal quiescent surface of the metal layer 22 is indicated by arrow 24. The position of the nominal quiescent surface of the slag layer 23 is indicated by arrow 25. The term "quiescent surface" is understood to mean the surface when there is no injection of gas and solids into the vessel 11.

The vessel 11 is provided with solids injection lances 27 that extend downwardly and inwardly through openings (not shown) in the side walls 14 of the vessel and into the slag layer 23. Two solids injection lances 27 are shown in FIG. 1. However, it can be appreciated that the vessel 11 may have any suitable number of such lances 27. In use, iron ore fines, solid carbonaceous material (such as, for example, coal or coke breeze) and fluxes are co-injected through outlet ends 28 of the lances 27 into the molten bath and preferably into metal layer 22. The iron ore fines, solid carbonaceous material, and fluxes are entrained in a carrier gas, typically an oxygen-deficient carrier gas, such as nitrogen. The following description is in the context that the carrier gas for the iron ore fines and solid carbonaceous material is nitrogen.

The outlet ends 28 of the lances 27 are above the surface of the metal layer 22 during operation of the process. This position of the lances 27 reduces the risk of damage through contact with molten metal and also makes it possible to cool the lances by forced internal water cooling without significant risk of water coming into contact with the molten metal in the vessel 11.

The vessel 11 also has a gas injection lance 26 for delivering a hot air blast into an upper region of the vessel 11. The lance 26 extends downwardly through the roof 17 of the vessel 11 into the upper region of the vessel 11. In use, the lance 26 receives an oxygen enriched hot air flow through a hot gas delivery duct (not shown), which extends from a hot gas supply station (also not shown).

Figure 2:
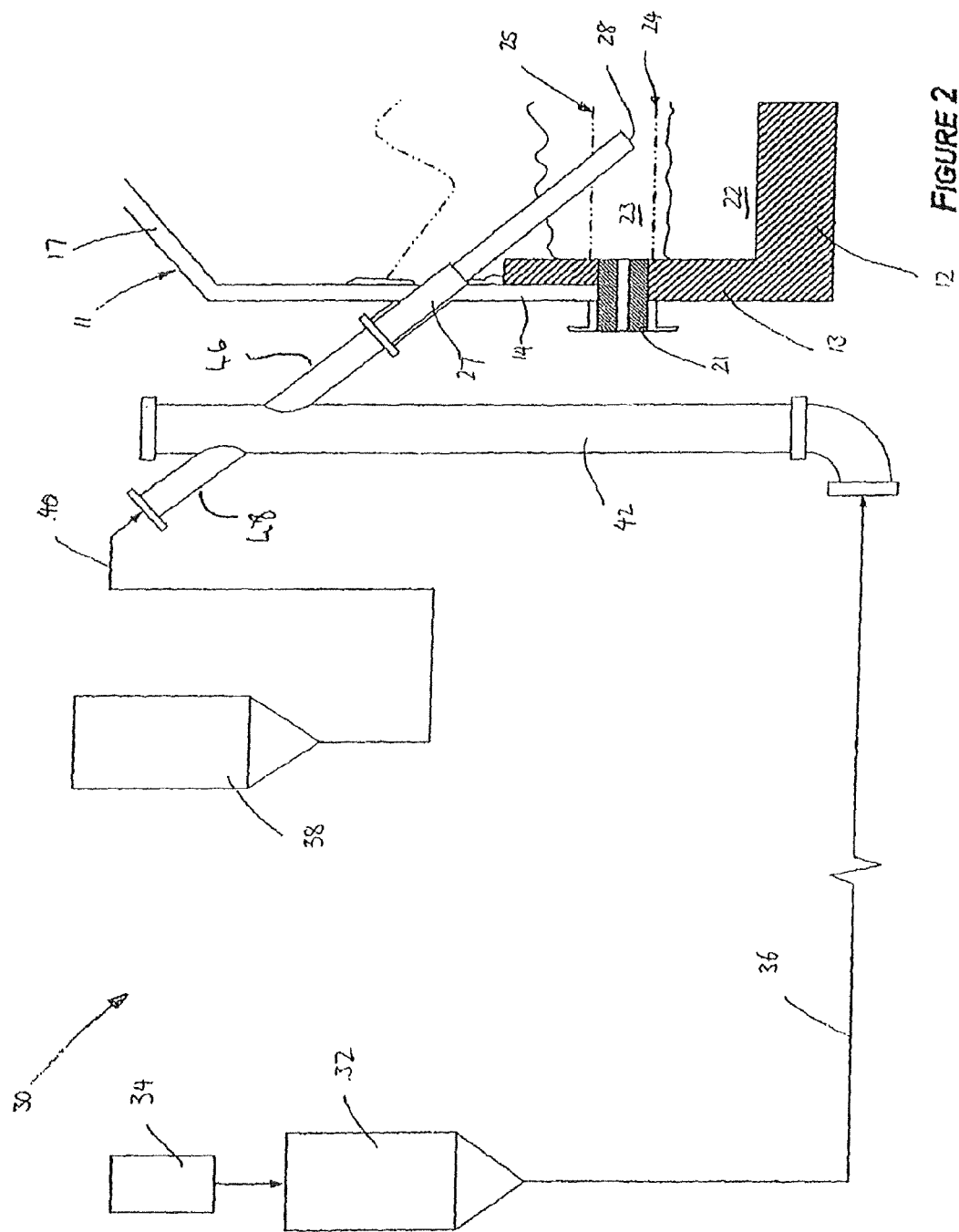
FIG. 2 is a schematic view that illustrates the above-mentioned embodiment of the direct smelting plant.

FIG. 2 shows schematically one embodiment of a direct smelting plant in accordance with the invention.

The plant includes the direct smelting vessel 11.

The plant also includes a pre-treatment unit 34 in the form of a pre-heater for heating iron ore fines.

The plant also includes an ore dispensing/metering unit 32 for dispensing heated iron ore fines from the pre-heater 34.

The ore dispensing/metering unit 32 is constructed to dispense heated iron ore fines with nitrogen carrier gas. The ore dispensing/metering unit 32 can be in the form of a plurality of bins that allow the heated iron ore fines to be transferred from standard atmospheric conditions to an environment of pressurized carrier gas. However, for the purposes of the present invention, the ore dispensing/metering unit 32 can be considered as a single unit.

In use, iron ore fines are fed to the pre-heater 34 from a stockpile (not shown) and the pre-heater heats the fines. The pre-heater 34 is arranged to heat the fines such that the iron ore fines are at a temperature of at least 500° C. and typically of the order of 600° C. to 700° C. at the point of injection into the vessel 11. Off gases can be supplied from the outlet 18 to the pre-heater 34, such that heat can be transferred from the off gases to the iron ore fines. The pre-heater 34 is arranged to supply the heated iron ore fines to the ore dispensing/metering unit 32.

The plant also includes a material supply apparatus 30 for supplying heated iron ore fines and solid carbonaceous material in the form of coal into the vessel 11.

The material supply apparatus 30 includes a first supply line 36 for receiving heated iron ore fines from the ore dispensing/metering unit 32 and transporting the heated iron ore fines to one of the lances 27. Accordingly, in use, iron ore fines are discharged from the ore dispensing/metering unit 32 into the supply line 36 and are transported to the lance 27 and injected into the vessel 11 via the lance.

The material supply apparatus 30 also includes an assembly for supplying coal to the first supply line 36 downstream of the ore dispensing/metering unit 32 and as close as possible to the lance 27 to facilitate co-injection of coal and heated iron ore fines into the vessel 11. The assembly is in the form of a coal dispensing assembly 38 which receives coal from a stockpile (not shown) and a second supply line 40.

The coal dispensing assembly 38 can be in the form of a plurality of bins that allow coal to be transferred from standard atmospheric conditions to an environment of a pressurized nitrogen carrier gas. However, for the purposes of the present invention, the coal dispensing assembly 38 can be considered to be a single unit.

The first supply line 36 is positioned approximately level with the base 12 of the vessel 11.

The supply line 36 includes an upwardly extending section 42, which conveys the heat iron ore fines from a position that is approximately level with the base 12 to at least the height of the inlet of the lance 27.

The supply line 36 also includes a downwardly extending section 46 which connects the line to an inlet end of the lance 27. The section 46 is formed to be co-axial with the lance 27 when in an operating position as shown in FIG. 2. The supply line 36 also includes an upwardly extending section 48 that is co-axial with the section 46 and forms an inlet section for coal into the line 36.

The second supply line 40 is connected to section 48 of the supply line 36 and therefore is connected to the line as close to the inlet to the lance 27.

In use, coal at ambient temperature is discharged from the coal dispensing assembly 38 with nitrogen carrier gas into the second supply line 40 and then into the sections 48 and 46 of the first supply line 36 and mixes with the heated iron fines being transported in the line 36 at a gas conveying speed of 20-30 m/s. The combined heated iron ore fines and coal are subsequently transported via the section 46 of the supply line 36 to the inlet end of the lance 27 and are co-injected via the lance 27 into the vessel. Typically, the pressure drop across the lance 27 is 1.0 to 2.0 bar (g).

Thus, it can be seen that, in use, iron ore fines are heated in the pre-heater 34 to an elevated temperature, typically of the order of 600° C. to 700° C. The iron ore fines are subsequently transported along the supply line 36 to the lance 27. The coal is injected into the supply line 36 with the heated iron ore fines as close as possible to the inlet of the lance 27—with minimal risk of tar formation and undesirable reactions between the heated iron ore fines. The heated iron ore fines and coal are transported to the inlet end of the lance 27 and then along the length of the lance to the outlet end 28 and into the vessel 11.

The coal may be injected into the supply line 36 with the heated iron ore fines at any location on the line 36 upstream of the location shown in the Figure, subject to the location being sufficiently close to the lance 27 to accommodate factors, including that the location be such that there is minimal risk of tar formation and undesirable reactions between the heated iron ore fines. Typically, such a location can be described as being within 50% of the length of the supply line 36 from the inlet end of the lance 27, with the length of the line being measured between the location and the inlet end of the lance 27. Typically, such a location can also be described as being less than 1 second, typically less than 0.5 seconds, conveying time to the inlet end of the lance 27 in a situation in which the conveying speed in the line is 20-30 m/sec, with the conveying speed being the speed of the gas phase in which the coal is entrained. Typically, such a location can also be described as being less than 30 m, preferably less than 20 m, from the inlet end of the lance 27, with the length of the line being measured between the location and the inlet end of the lance 27, in a situation in which the gas conveying speed in the line is 20-30 m/sec.

Many modifications may be made to the embodiments described above without departing from the spirit and scope of the present invention.

It will be appreciated that the plant may additionally be provided with a flux dispensing system (not shown) that includes a flux supply line (also not shown) for supplying fluxes to the solids injection lances 27. The flux supply line may be connected to the second supply line 40 prior to connection of the second supply line to the first supply line 36. Alternatively, the flux supply line may be connected to the first supply line 36 either upstream or downstream of the connection of the second supply line 40 to the first supply line.

It will also be appreciated that the first supply line 36 may include one or more branches such that two or more lances 27 can receive ore and coal from a single first supply line. Alternatively or additionally, the material supply apparatus may include two or more first supply lines 36 that operate independently and supply separate lances 27.

It will also be appreciated that the pre-treatment unit 34 may be any suitable unit and is not confined to a pre-heater. For example, the pre-treatment unit may be a unit that pre-reduces as well as preheats metalliferous material.

It will also be appreciated that the ore dispensing/metering unit 32 and the pre-heater 34, whilst described as separate units, may be a single unit.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

What is claimed is:

1. A direct smelting plant comprising:
   (a) a direct smelting vessel;
   (b) one or more than one solids injection lance extending into the direct smelting vessel, the or each solids injection lance having an inlet end;
   (c) an ore dispensing/metering unit that is adapted to dispense hot ore and a first solids supply line adapted to transport hot ore from the ore dispensing/metering unit to the inlet end of the at least one lance;
   (d) an assembly for supplying coal to the first solids supply line, the assembly including a coal dispensing/metering unit, and wherein the coal supply assembly is adapted to supply coal directly to the first supply line at a location on the first solids supply line that is less than one (1) second of a conveying time (based on average gas transit time) to an inlet end of the at least one lance for conveying speeds in the first supply line less than 50 meters per second so that there can be co-injection of heated metalliferous material and coal from the lance into the vessel; and
   (e) an ore pre-treatment unit adapted to heat the ore.

2. The plant defined in claim 1, wherein the coal supply assembly is adapted to supply coal directly to the first supply line downstream of the ore dispensing/metering unit at a location that minimizes risk of tar formation and undesirable reactions between the hot iron ore fines before injection into the direct smelting vessel.

3. The plant defined in claim 1, wherein the coal supply assembly is adapted to supply coal to the first solids supply line at a location on the line that is within 50% of the length of the line from an inlet end of the lance, with the length of the line being measured between the ore dispensing/metering unit and the inlet end of the lance.

4. The plant defined in claim 1, wherein the coal supply assembly is adapted to supply coal to the first solids supply line at a location on the first solids supply line that is less than 30 m from an inlet end of the lance, with the length of the line being measured between the ore dispensing/metering unit and the inlet end of the lance, in a situation in which the conveying speed in the line is less than 50 m/sec.

5. The plant defined in claim 1, wherein the coal supply assembly comprises a second solids supply line for transporting coal from the coal dispensing/metering unit to the first solids supply line.

6. The plant defined in claim 5, wherein the first solids supply line comprises a section that extends upwardly to at least the level of the inlet end of the lance, and the second solids supply line is connected to the first solids supply line at a lower end of the upwardly extending section.

7. The apparatus defined in claim 5, wherein the first solids supply line comprises a section that extends upwardly to at least the level of the inlet end of the lance, and the second solids supply line is connected to the first solids supply line at an upper end of the upwardly extending section.

8. The apparatus defined in claim 5, wherein the first solids supply line comprises a final section that extends downwardly and inwardly with respect to the vessel to the inlet end of the lance, and the second solids supply line is connected to the final section.

9. A direct smelting plant comprising:
   (a) a direct smelting vessel;
   (b) one or more than one solids injection lance extending into the direct smelting vessel, the or each solids injection lance having an inlet end;
   (c) an ore dispensing/metering unit that is adapted to dispense hot ore and a first solids supply line adapted to transport hot ore from the ore dispensing/metering unit to the inlet end of the at least one lance;
   (d) an assembly for supplying coal to the first solids supply line, the assembly including a coal dispensing/metering unit, and wherein the coal supply assembly is adapted to supply coal directly to the first supply line; and
   (e) an ore pre-treatment unit adapted to heat the ore.

* * * * *